US011494154B2

(12) United States Patent
Dai et al.

(10) Patent No.: US 11,494,154 B2
(45) Date of Patent: Nov. 8, 2022

(54) PROCESSING METHOD AND HANDHELD DEVICE

(71) Applicant: HUAWEI TECHNOLOGIES CO., LTD., Shenzhen (CN)

(72) Inventors: Renjun Dai, Shanghai (CN); Hongliang Liu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 118 days.

(21) Appl. No.: 16/957,714

(22) PCT Filed: Sep. 20, 2018

(86) PCT No.: PCT/CN2018/106655
§ 371 (c)(1),
(2) Date: Jun. 24, 2020

(87) PCT Pub. No.: WO2019/128330
PCT Pub. Date: Jul. 4, 2019

(65) Prior Publication Data
US 2020/0364023 A1    Nov. 19, 2020

(30) Foreign Application Priority Data

Dec. 27, 2017   (CN) .......................... 201711449448.1

(51) Int. Cl.
*G06F 3/14*        (2006.01)
*G06F 3/147*       (2006.01)
(Continued)

(52) U.S. Cl.
CPC ............ *G06F 3/1454* (2013.01); *G06F 3/147* (2013.01); *G06F 13/4282* (2013.01);
(Continued)

(58) Field of Classification Search
CPC ...... G06F 3/1454; G06F 3/147; G06F 9/4411; G06F 13/122; G06F 13/4063;
(Continued)

(56) References Cited

U.S. PATENT DOCUMENTS 8,659,400 B2    2/2014  Arling et al.
10,255,219 B2 *  4/2019  Jensen ................... G06F 3/165
(Continued)

FOREIGN PATENT DOCUMENTS

CN        102183993 A    9/2011
CN        103609130 A    2/2014
(Continued)

*Primary Examiner* — Tom V Sheng
(74) *Attorney, Agent, or Firm* — Rimon PC

(57) ABSTRACT

Various embodiments provide a method performed by a handheld device and the handheld device, where a USB interface of the handheld device with an infrared remote control application is connected to a port of a display device by using an adapter cable, the handheld device determines that a preset source port of the display device is not the connected port, and automatically switches the source port to the connected port by using the infrared remote control application. The handheld device sends to-be-displayed content of the handheld device to the display device by using the USB interface, the adapter cable, and the connected port to enable the display device to display the to-be-displayed content.

20 Claims, 7 Drawing Sheets

(51) Int. Cl.
*G06F 13/42* (2006.01)
*H04N 21/41* (2011.01)
*H04N 21/422* (2011.01)
*H04N 21/4363* (2011.01)
*G06F 13/12* (2006.01)
*G06F 13/40* (2006.01)
*G06F 9/4401* (2018.01)

(52) U.S. Cl.
CPC .......... *G06F 9/4411* (2013.01); *G06F 13/122* (2013.01); *G06F 13/4063* (2013.01); *G06F 2213/0042* (2013.01); *H04N 21/4122* (2013.01); *H04N 21/41265* (2020.08); *H04N 21/42221* (2013.01); *H04N 21/43632* (2013.01); *H04N 21/43635* (2013.01)

(58) Field of Classification Search
CPC ........ G06F 13/4282; G06F 2213/0042; H04N 21/41265; H04N 21/42221; H04N 21/43632; H04N 21/43635; H04N 21/4122
USPC .......................................................... 345/156
See application file for complete search history.

(56) References Cited

U.S. PATENT DOCUMENTS

| | | | |
|---|---|---|---|
| 2005/0132408 A1* | 6/2005 | Dahley | H04N 7/142 348/E7.087 |
| 2009/0153288 A1 | 6/2009 | Hope et al. | |
| 2011/0043371 A1* | 2/2011 | German | H04B 10/808 340/815.45 |
| 2014/0078022 A1 | 3/2014 | Dusterhoff | |
| 2014/0130101 A1 | 5/2014 | Yoshitani et al. | |
| 2014/0267910 A1 | 9/2014 | Chugh et al. | |
| 2017/0102736 A1* | 4/2017 | Peng | G06F 13/385 |
| 2017/0139467 A1* | 5/2017 | Waters | G06F 1/3287 |
| 2019/0332152 A1* | 10/2019 | Hunt | G06F 13/4282 |

FOREIGN PATENT DOCUMENTS

| | | |
|---|---|---|
| CN | 103916694 A | 7/2014 |
| CN | 104796629 A | 7/2015 |
| WO | 2006101877 A2 | 9/2006 |

* cited by examiner

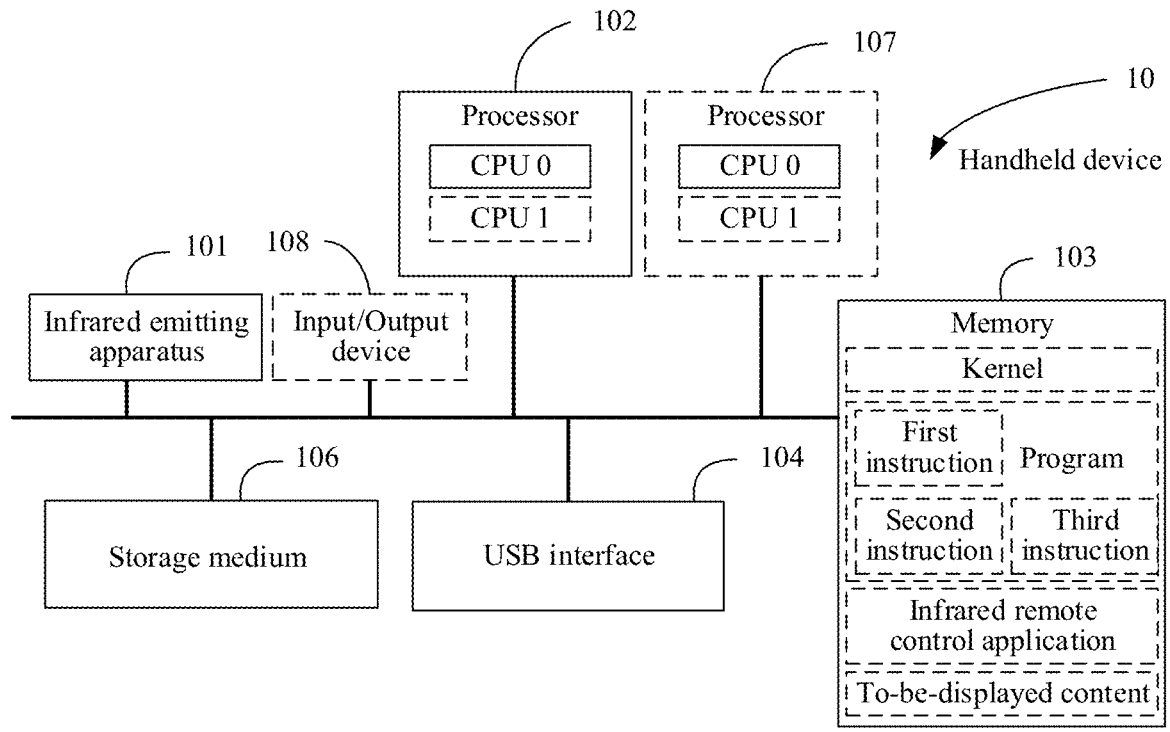

FIG. 2

S300: Performed by a handheld device

A USB interface of the handheld device is connected to a port of a display device by using an adaptercable — 303

The handheld device determines that a preset source port of the display device is not the port, and automatically switches the source port to the port by using an infrared remote control application — 305

The handheld device sends to-be-displayed content of the handheld device to the display device by using the USB interface, the adapter cable, and the port, so that the display device displays the to-be-displayed content — 307

FIG. 3

EDID 1.4 data format [edit]

EDID structure 1.4[8][9]

| Bytes | | | Description |
|---|---|---|---|
| 0-19 | | | Header information |
| | 0-7 | | Fixed header pattern: 00 FF FF FF FF FF FF 00 |
| | | | Manufacturer ID. This is a legacy Plug and Play ID assigned by Microsoft, which is a big-endian 16-bit value made up of three 5-bit letters: 00001=A, 00010=B, ... 11010=Z.E.g. 24 4d = 0 01001 00010 01101 = "IBM". |
| | 8-9 | Bit 15 | (Reserved, always 0) |
| | | Bits 14-10 | First letter of manufacturer ID (byte 8, bits 6-2) |
| | | Bits 9-5 | Second letter of manufacturer ID (byte 8, bit 1 through byte 9 bit 5) |
| | | Bits 4-0 | Third letter of manufacturer ID (byte 9 bits 4-0) |
| | 10-11 | | Manufacturer product code.16-bit number, little-endian |

FIG. 5

PROCESSING METHOD AND HANDHELD DEVICE

CROSS-REFERENCE TO RELATED APPLICATIONS

This application is a National Stage of International Application No. PCT/CN2018/106655, filed on Sep. 20, 2018, which claims priority to Chinese Patent Application No. 201711449448.1, filed on Dec. 27, 2017. Both of the aforementioned applications are hereby incorporated by reference in their entireties.

TECHNICAL FIELD

This application relates to the field of communications technologies, and in particular, to a processing method and a handheld device.

BACKGROUND

Because of relative small handheld device (for example, a mobile phone) screens, currently, some mobile phones support displaying content of the mobile phones on a screen of a display device (for example, a television) by using an adapter cable. The television has a plurality of ports, and these ports include but are not limited to a high definition multimedia interface (High Definition Multimedia Interface, HDMI) 1, an HDMI 2, a display port (Display Port, DP), a digital visual interface (Digital Visual Interface, DVI), a video graphics array (Video Graphics Array, VGA), and the like. One end of the adapter cable is generally a USB (Universal Serial Bus) connector, and the other end of the adapter cable is one of an HDMI connector, a DVI connector, a USB connector, a MINI DP connector, a DP connector, or a VGA connector. A type of the USB connector includes but is not limited to: a USB Type-A connector, a USB Type-B connector, a USB Mini-A connector, a USB Mini-B connector, a USB Micro-A connector, a USB Micro-B connector, or a USB Type-C connector. When a USB interface of a mobile phone is connected to a port (for example, the HDMI 1) of the television by using the adapter cable, the content of the mobile phones cannot be displayed on the television because a preset source port of the television is the VGA instead of the HDMI 1. In this case, a user needs to find a remote controller and manually adjusts the source port, which is complex and time-consuming.

SUMMARY

Various embodiments can provide a processing method and a handheld device, so that the handheld device can automatically switch a source port of a display device, and display to-be-displayed content of the handheld device on a screen of the display device. This provides convenience for a user and greatly shortens a duration for displaying the to-be-displayed content of the handheld device on the screen of the display device.

A first aspect provides a processing method, applied to a handheld device with an infrared remote control application, where a USB interface of the handheld device is connected to a port of a display device by using an adapter cable, and the method includes: determining, by the handheld device, that a preset source port of the display device is not the port; automatically switching the source port to the port by using the infrared remote control application; and sending, by the handheld device, to-be-displayed content of the handheld device to the display device by using the USB interface, the adapter cable, and the port, so that the display device displays the to-be-displayed content, where the to-be-displayed content includes content displayed by a display of the handheld device, or a preset user interface of the handheld device. By using the foregoing solution, the handheld device can automatically switch the source port of the display device, and display to-be-displayed content of the handheld device on the screen of the display device. This provides convenience for the user and greatly shortens a duration for displaying the to-be-displayed content of the handheld device on the screen of the display device, and also avoids a trouble of which the user cannot find a remote controller everywhere.

In some embodiments, in one example implementation, that the handheld device determines that the source port for displaying content of the display device is not the port includes: determining, by the handheld device based on a parameter value obtained by using the USB interface, that the source port is not the port.

In some embodiments, in one example implementation, the automatically switching the source port to the port by using the infrared remote control application includes: automatically starting the infrared remote control application, and triggering, by using the infrared remote control application, the handheld device to send an infrared instruction to the display device, where the infrared instruction is used to instruct the display device to switch the source port to the port, and an identifier of the port is obtained by the handheld device from the display device by using the USB interface. By using the foregoing solution, an operation of manually tapping the infrared remote control application by the user can be avoided.

In some embodiments, in one example implementation, remote control code of the infrared remote control application is automatically set by the handheld device based on at least one of a brand parameter or a model parameter of the display device, and the brand parameter or the model parameter of the display device is obtained by the handheld device from the display device by using the USB interface. By using the foregoing solution, an operation of manually setting the infrared remote control application by the user can be avoided, because after obtaining the at least one of the brand parameter or the model parameter of the display device by using the port, the handheld device automatically sets the remote control code of the infrared remote control application, and the user does not need to manually set the remote control code.

In some embodiments, in one example implementation, a type of the USB interface includes one of a USB Type-A interface, a USB Type-B interface, a USB Mini-A interface, a USB Mini-B interface, a USB Micro-A interface, a USB Micro-B interface, or a USB Type-C interface, and a type of the port includes one of an HDMI port, a DP port, a MINI DP port, a USB port, a VGA port, or a DVI port.

In some embodiments, in one example implementation, before the handheld device determines that the preset source port of the display device is not the port, the handheld device detects that the display device is in a standby state, automatically starts the infrared remote control application, and sends an infrared wakeup instruction. By using the technical solution, it can be avoided that the display device is woken up by using the remote controller, automation is further implemented, and searching for the remote controller is also avoided.

In some embodiments, in one example implementation, before the handheld device determines that the preset source port of the display device is not the port, the handheld device automatically starts the infrared remote control application, and sends at least one infrared wakeup instruction.

A second aspect provides a handheld device, where a USB interface of the handheld device is connected to a port of a display device by using an adapter cable, and the handheld device includes: an infrared emitting apparatus, one or more processors, a memory, an infrared remote control application, and one or more programs, where the one or more programs are stored in the memory and are configured to be executed by the one or more processors, the one or more programs include an instruction, and when the instruction is run on the handheld device, the handheld device is enabled to perform the processing method provided in any one of the first aspect or the possible implementations of the first aspect.

A third aspect provides a handheld device. The handheld device may implement a function executed by the handheld device in the processing method of the foregoing first aspect, and the function may be implemented by hardware or may be implemented by executing corresponding software by hardware. The hardware or the software includes one or more modules or units that correspond to the foregoing function. Based on a same inventive concept, for a principle of resolving a problem by the handheld device and beneficial effects, refer to the first aspect, possible method implementations of the foregoing first aspect, and beneficial effects arising. Therefore, for an implementation of the handheld device, refer to the foregoing first aspect and the possible method implementations of the first aspect. Details are not repeated herein again.

A fourth aspect provides a handheld device, where a USB interface of the handheld device is connected to a port of a display device by using an adapter cable, and the handheld device includes: an infrared emitting apparatus, one or more processors, a memory, an infrared remote control application, and one or more programs, where the one or more programs are stored in the memory and are configured to be executed by the one or more processors, and the one or more programs include an instruction used to perform the processing method provided in any one of the first aspect or the possible implementations of the first aspect.

A fifth aspect provides a computer-readable storage medium. The storage medium includes an instruction. When the instruction is run on a computer, the computer is enabled to perform the processing method provided in any one of the first aspect or the possible implementations of the first aspect.

A sixth aspect provides a computer program product including an instruction. When the computer program product is run on a handheld device, the handheld device is enabled to perform the processing method provided in any one of the first aspect or the possible implementations of the first aspect.

A seventh aspect provides a device, where the device exists in a product form of a chip, a structure of the device includes a processor and a memory, the memory is configured to be coupled to the processor, and configured to store a program instruction and data that are of the device; and the processor is configured to execute the program instruction stored in the memory, so that the device performs the processing method provided in any one of the first aspect or the possible implementations of the first aspect.

An eighth aspect provides a graphical user interface on a handheld device, where the handheld device includes a display, a memory, an infrared emitting apparatus, an infrared remote control application, and one or more processors configured to execute one or more programs stored in the memory, and the graphical user interface includes a user interface displayed based on the prompt method provided in the first aspect or any possible implementation of the first aspect.

After the drawings and detailed descriptions in the following are researched, another system, method, feature, and advantage become obvious for persons of ordinary skill in the art. It is required that the another system, method, feature, and advantage are included in the descriptions, are within the scope of the present invention, and are protected by the appended claims.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

FIG. 2 is a simplified block diagram of a handheld device according to an embodiment of the present invention;

FIG. 3 is a schematic flowchart of a processing method according to an embodiment of the present invention;

FIG. 5 is a schematic diagram of an EDID data format according to an embodiment of the present invention;

Figure 1:
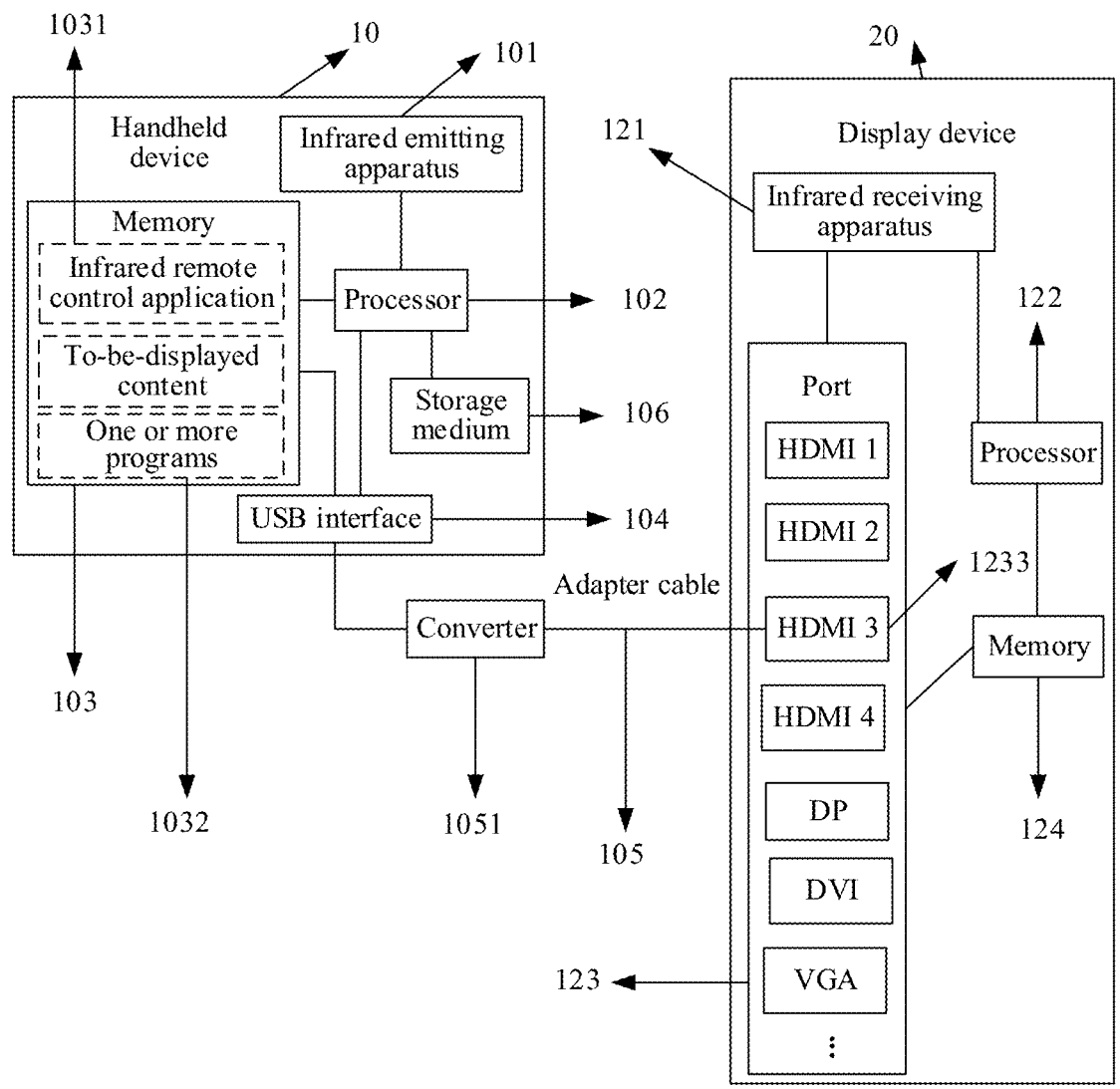
FIG. 1 is a simplified block diagram of a connection between a handheld device and a display device according to an embodiment of the present invention.

In all the accompanying drawings, a same reference symbol or description represents similar but not necessarily completely same components. Examples of embodiments described in this specification are easily modified or replaced into another form. Therefore, specific embodiment is illustrated by using examples in the drawings and is described in detail in this specification. However, the examples of embodiments described in this specification are not intended to limit the disclosed specific form. Instead, the present invention covers all modifications, equivalence, and replacements that fall within the scope of the appended claims.

DESCRIPTION OF EMBODIMENTS

To make the objectives, technical solutions, and advantages of this application more understandable, the following provides detailed descriptions. The detailed descriptions provide various embodiments of a device and/or a process by using block diagrams, flowcharts, and/or examples. These block diagrams, flowcharts, and/or examples include one or more functions and/or operations, so persons in the art may understand that each function and/or operation in the block diagrams, the flowcharts, and/or the examples may be performed independently and/or jointly by using much hardware, software, and firmware, and/or any combination thereof.

FIG. 1 is a simplified block diagram of a connection between a handheld device and a display device. As shown, a handheld device 10 is connected to a display device 20 by using an adapter cable 105. A connector of the adapter cable 105 is inserted into a USB interface of the handheld device 10, and another connector of the adapter cable 105 is inserted into a port 1233 (for example, an HDMI 3 shown in the figure) of a port 123 of the display device 20. It should be noted that the adapter cable 105 includes a converter 1051, two connectors, and a connection cable. Different types of adapter cables 105 have different converters 1051 and corresponding connectors, and the converters 1051 are configured to perform conversion between two interface protocols. A type of a USB interface 104 of the handheld device 10 includes but is not limited to a USB Type-A interface, a USB Type-B interface, a USB Mini-A interface, a USB Mini-B interface, a USB Micro-A interface, a USB Micro-B interface, or a USB Type-C interface. A type of the port 123 of the display device 20 includes but is not limited to an HDMI port, a DP port, a VGA port, a USB port, a DVI port, an analog signal port, or a digital signal port. In this specification, an example in which the type of the USB interface 104 of the handheld device 10 is a USB Type-C interface, and the type of the adapter cable is a USB Type-C to HDMI is used for description. The display device 20 includes a port 123, a processor 122, a memory 124, and an infrared receiving apparatus 121. The handheld device 10 includes a processor 102 coupled to one or more data storage apparatuses. The data storage apparatus may include a storage medium 106 and a memory 103. The storage medium 106 may be read-only such as a read-only memory (ROM), or be readable/writable such as a hard disk or flash memory. The memory 103 may be a random access memory (RAM). The memory 103 may be physically integrated with the processor 102, or integrated into the processor 102, or constructed in one or more independent units. The handheld device 10 further includes an infrared emitting apparatus 101 and a USB interface 104. For a simplified block diagram of the handheld device 10, further refer to FIG. 2.

The processor 102 is a control center of the handheld device 10 and provides sorting and processing facilities to execute instructions, perform interrupt operations, provide timing functions, and perform many other functions. In some embodiments, the processor 102 includes one or more central processing units (CPU), for example, a CPU 0 and a CPU 1 shown in FIG. 2. In some embodiments, the handheld device 10 includes at least one processor, for example, the processor 102 and the processor 107 shown in FIG. 2. Both the processor 102 and the processor 107 may be a single-core (single-CPU) processor or a multi-core (multi-CPU) processor. Unless otherwise specified, components such as a processor or a memory that are described to perform a task may be implemented as general components temporarily configured to perform a task within a given time or as specific components manufactured to perform a task. The term "processor" used in this specification refers to one or more devices, circuits, and/or processing kernels configured to process data such as a computer program instruction. In addition, the processor 102 or the processor 107 may be a central processing unit (CPU), a general-purpose processor, a coprocessor, a digital signal processor (DSP), an application-specific integrated circuit (ASIC), a field programmable gate array (FPGA), or another programmable logical device, a transistor logical device, a hardware component, or any combination thereof. Alternatively, the processor 102 or the processor 107 may be a combination of processors implementing a computing function, for example, a combination of one or more microprocessors, or a combination of the DSP and a microprocessor.

The processor 102 and/or the processor 107, or the CPU of the processor 102 and/or the processor 107 stores executed program code in the memory 103 or the storage medium 106. In some embodiments, the program code stored in the storage medium 106 may be copied to the memory 103, so that the processor 102 and/or the processor 107 or the CPU of the processor 102 and/or the processor 107 executes the program code. The processor 102 and/or the processor 107, or the CPU of the processor 102 and/or the processor 107, may execute at least one kernel (for example, a kernel in an operating system sold with a trademark such as LINUZ™, UNIX™, WINDOWS™ ANDROID™, or IOS™). It is well known that the kernel is configured to control operations of the handheld device 10 by controlling execution of other programs or processes, controlling communication with a peripheral device, and controlling use of handheld device resources. In some embodiments, the memory 103 includes the foregoing kernel.

In some embodiments, the memory 103 further includes one or more programs, where the one or more programs include an instruction, and the instruction is used to: determine that a preset source port of the display device is not the port 1233, and automatically switch the source port to the port 1233 by using the infrared remote control application; and send to-be-displayed content of the handheld device 10 to the display device 20 by using the USB interface 104, the adapter cable 105, and the port 1233, so that the display device 20 displays the to-be-displayed content, where the to-be-displayed content includes content displayed by a display of the handheld device 10, or a preset user interface of the handheld device 10. In some embodiments, the instruction is further used to determine, based on a parameter value obtained by using the USB interface 104, that the source port is not the port 1233. In some embodiments, the instruction is further used to: automatically start the infrared remote control application, and trigger, by using the infrared remote control application, the handheld device to send an infrared instruction to the display device, where the infrared instruction is used to instruct the display device 20 to switch the source port to the port 1233, an identifier of the port 1233 is obtained by the handheld device 10 from the display device 20 by using the USB interface 104. It should be understood that remote control code of the infrared remote control application is automatically set by the handheld device 10 based on at least one of a brand parameter or a model parameter of the display device 20. The brand parameter or the model parameter of the display device 20 is obtained by the handheld device 10 from the display device 20 by using the USB interface 104.

In some embodiments, the memory 103 further includes an infrared remote control application, and the infrared remote control application may trigger the infrared emitting apparatus to send the infrared instruction. In some embodiments, the memory 103 further includes to-be-displayed content, where the to-be-displayed content includes content displayed by a display of the handheld device, or a preset user interface of the handheld device.

The handheld device 10 further includes a USB interface 104, to directly communicate with the display device 20 by using an adapter cable. The handheld device 10, or the processor 102 and/or the processor 107 may obtain information of the display device by using the USB interface 104. The information includes but is not limited to: a brand parameter of the display device, a model parameter of the display device, a source port currently set by the display device, and an identifier of a port connected to the adapter cable. The "preset source port of the display device" refers to a set source port of the display device. For example, the source port is preset to a VGA port. The handheld device 10, or the processor 102 and/or the processor 107 may further send the to-be-displayed content of the handheld device to the display device 20 by using the USB interface 104, the adapter cable 105, and the port 1233, so that the display device 20 displays the to-be-displayed content, and the to-be-displayed content includes content displayed by a display of the handheld device, or a preset user interface of the handheld device.

In some embodiments, the handheld device 10 further includes an input/output device 108. The input/output device 108 is coupled to the processor 101. An output device in the input/output device 108 can display information in one or more manners. An example of the output device is a visual display device, for example, a liquid crystal display (LCD), a light emitting diode (LED) display, or a cathode ray tube (CRT). The input/output device 108 can receive, in one or more manners, input of a user who uses the handheld device 10. An input device may be a touchscreen device, a sensor device, or the like.

The foregoing elements of the handheld device 10 may be coupled to each other by using any one of or any combination of a bus such as a data bus, an address bus, a control bus, an extended bus, or a local bus.

The handheld device 10 may be a general-purpose handheld device or an application-specific handheld device. In a practical example, the handheld device 10 may be a mobile phone, a personal digital assistant (PDA), a tablet computer, a wireless terminal device, an embedded system, or any other device having a structure similar to that shown in FIG. 2. The display device 20 may be a television, a device (for example, a projector, a display, or a laptop computer) that has a plurality of ports and an infrared instruction receiving function, or any other device having a structure similar to that shown in FIG. 2. However, the present invention is not merely limited to any particular type of the handheld device. To make the objectives, technical solutions, and advantages of the present invention clearer, the following describes the technical solutions of the embodiments of the present invention with reference to the accompanying drawings.

Various embodiments are described by using an example in which the type of the USB interface 104 of the handheld device 10 is a USB Type-C interface, and the type of the adapter cable is USB Type-C to HDMI. It is assumed that the USB Type-C interface of the handheld device 10 is connected to a port (an HDMI 3 port) of the display device by using the adapter cable.

From a perspective of the handheld device 10, a process S300 executed by the handheld device 10 is shown in FIG. 3.

S303. The USB interface 104 of the handheld device 10 is connected to a port 1233 of the display device 20 by using the adapter cable 105.

S305. The handheld device 10 determines that a preset source port of the display device 20 is not the port 1233, and automatically switches the source port to the port 1233 by using an infrared remote control application.

S307. The handheld device 10 sends to-be-displayed content of the handheld device 10 to the display device 20 by using the USB interface 104, the adapter cable 105, and the port 1233, so that the display device 20 displays the to-be-displayed content, where to-be-displayed content includes content displayed by a display of the handheld device 10, or a preset user interface of the handheld device 10.

By using the foregoing solution, the handheld device can automatically switch the source port of the display device, and display the to-be-displayed content of the handheld device on the screen of the display device. This provides convenience for the user and greatly shortens a duration for displaying the to-be-displayed content of the handheld device on the screen of the display device, and also avoids a trouble of which the user cannot find a remote controller anywhere.

It should be understood that S303 may be a usage scenario or an environment of the technical solutions provided herein. In this case, a process that may be executed by the handheld device 10 includes the following steps.

(1) The handheld device 10 performs S305 to S307 after starting to be connected to the display device 20 by using the adapter cable 105 for a preset duration; or, (2) After the handheld device 10 starts to be connected to the display device 20 by using the adapter cable 105, the handheld device 10 performs S305 to S307 after detecting a preset condition, the preset condition includes: The handheld device 10 obtains, from the USB interface 104, one or more parameter values on a register or a memory of the display device 20. For example, the handheld device 10 obtains at least two parameter values from the USB interface 104, where one parameter value indicates that a source port of the display device 20 is a VGA port, and the other parameter value indicates that a port 1233 connected to the handheld device is an HDMI 3 port. Alternatively, the handheld device 10 obtains at least one parameter value from the USB interface 104, where the parameter value indicates that the source port of the display device is not the port 1233; or, (3) After the handheld device 10 is connected to the display device 20 by using the adapter cable 105, the handheld device 10 performs S305 to S307 after detecting one or more operations performed by the user on the handheld device 10 (for example, the user taps a projection button on a projection function interface of the handheld device 10, where the projection function interface automatically appears after the handheld device 10 is connected to the display device 20 by using the adapter cable 105. Alternatively, the user enters the projection function interface by performing a tapping operation on the handheld device 10, and then the user taps the projection button on the projection function interface).

It should be understood that in some embodiments, S303 may also be understood as a prerequisite for triggering S305 and S307. In this case, a process that may be executed by the handheld device 10 includes the following steps.

After the handheld device 10 detects that the handheld device 10 is connected to the display device 20 by using the adapter cable 105, the handheld device performs S305 to S307. For S305, that the handheld device 10 determines that the source port of the display content of the display device is not the port 1233 includes:

determining, by the handheld device 10 based on a parameter value obtained by using the USB interface, that the source port is not the port 1233. For example, the handheld device 10 obtains, from the USB interface 104, one or more parameter values on a register or a memory of the display device 20.

In one example implementation, the handheld device 10 obtains at least two parameter values from the USB interface 104, where one parameter value indicates that a source port of the display device 20 is a VGA port, and the other parameter value indicates that a port 1233 connected to the handheld device is an HDMI 3 port. For example, the handheld device 10 obtains display port configuration data (Display Port Configuration Data, DPCP) of the display device 20 by using an auxiliary channel (Auxiliary Channel, AUX CH), and obtains a type of the port 1233 of the display device 20 by using the DPCP. The handheld device 10 obtains the source port of the display device 20 by using the AUX CH.

In another example implementation, the handheld device 10 obtains at least one parameter value from the USB interface 104, where the parameter value indicates that the source port of the display device is not the port 1233. For example, the handheld device 10 obtains the parameter value by using the AUX CH, and the parameter value indicates that the source port of the display device is not the port 1233.

The automatically switching the source port to the port 1233 by using the infrared remote control application includes:

automatically starting, by the handheld device 10, the infrared remote control application, and triggering, by using the infrared remote control application, the handheld device to send an infrared instruction to the display device, where the infrared instruction is used to instruct the display device to switch the source port to the port 1233, an identifier of the port 1233 is obtained by the handheld device 1233 from the display device 20 by using the USB interface 104. For example, the infrared instruction is a channel selection instruction, and the channel selection instruction is used to instruct the display device 20 to switch the source port to the port 1233. The display device 20 switches the source port of the display device to the port 1233 based on the channel selection instruction. By using the foregoing solution, an operation of manually tapping the infrared remote control application by the user can be avoided. It should be understood that the source port is also referred to as an input source port, and may be understood as a source port of content currently displayed by the display device.

Remote control code of the infrared remote control application is automatically set by the handheld device 10 based on at least one of a brand parameter or a model parameter of the display device 20, and the brand parameter or the model parameter of the display device 20 is obtained by the handheld device 10 from the display device 20 by using the USB interface 104. It should be understood that the infrared remote control application may be an application program pre-installed in the handheld device when the handheld device is delivered from a factory, or may be an application program downloaded by the user and installed in the handheld device. It is assumed that the handheld device 10 is connected to the display device 20 for the first time by using the adapter cable, preset remote control code in the infrared remote control application in the handheld device is a Samsung model 1 television, or the preset remote control code is empty, and the display device 20 is a Panasonic TH-65AX800C television. An example in which the type of the USB interface 104 of the handheld device 10 is a USB Type-C interface and the type of the adapter cable is USB Type-C to HDMI is used for description. After the USB Type-C interface of the handheld device 10 is connected to a port (an HDMI 3 port) of the display device by using the adapter cable, the handheld device 10 identifies, by using the USB Power Delivery protocol, that the adapter cable 105 is a display port (Display Port, DP) device, and the handheld device 10 starts a DP module, the handheld device 10 obtains extended display identification data (Extended display identification data, EDID) information of the display device 20 by using the AUX CH, and obtains information such as a brand parameter, a model parameter, and resolution of the display device by using the EDID information. The EDID information of the display device is stored in a memory (for example, a PROM or an EEPROM). A format of the EDID is shown in FIG. 5. The handheld device 10 obtains the brand parameter and/or the model parameter by using the EDID information, and automatically sets remote control code of the infrared remote control application, so that the infrared remote control application may remotely control the display device 20. By using the foregoing solution, an operation of manually setting the infrared remote control application by the user can be avoided. When the handheld device 10 determines that the preset remote control code is the same as a model of the display device 20, the handheld device 10 does not need to perform an automatic setting action.

For S307, the handheld device 10 sends to-be-displayed content of the handheld device 10 to the display device 20 by using the USB interface 104, the adapter cable 105, and the port 1233, and the display device 20 displays the to-be-displayed content. The to-be-displayed content includes content displayed by a display of the handheld device, or a preset user interface (for example, an interaction interface having one or more application icons) of the handheld device.

Figure 6:
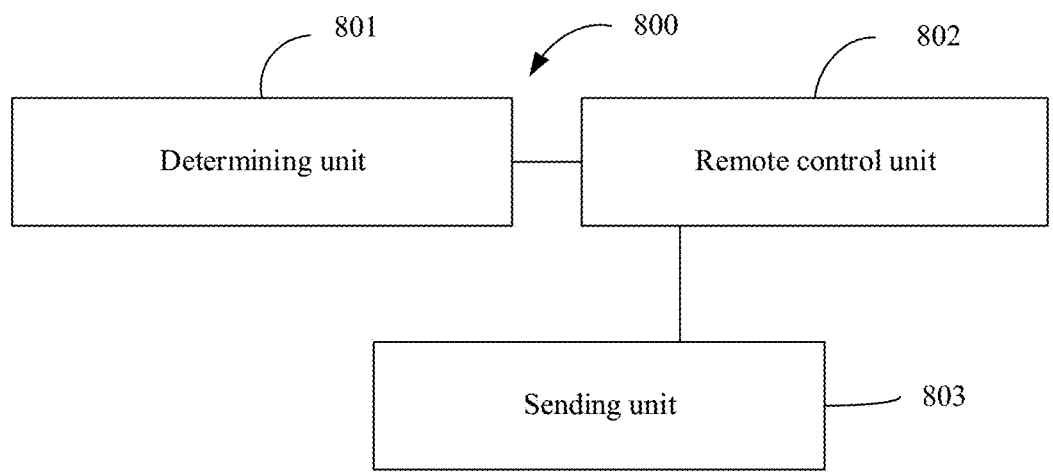
FIG. 6 is a schematic structural diagram of an apparatus according to an embodiment of the present invention.

In some embodiments, as shown in FIG. 6, in one example implementation, the process 300 further includes: S308. Before the handheld device 10 determines that the preset source port of the display device 20 is not the port 1233, the handheld device 10 detects that the display device 20 is in a standby state, automatically starts the infrared remote control application, and sends an infrared wakeup instruction. After the display device 20 receives the infrared wakeup instruction, the display device 20 enters a normal working state from the standby state. It should be understood that S308 may be performed before S303, or S308 may be performed after S303 and before S305.

In one example implementation, the process 300 further includes: S309. Before the handheld device 10 determines that the preset source port of the display device 20 is not the port 1233, the handheld device 10 automatically starts the infrared remote control application, and sends at least one infrared wakeup instruction. After the display device 20 receives the infrared wakeup instruction, if the display device 20 is in a standby state, the display device 20 enters the normal working state from the standby state, and if the display device 20 is in a normal working state, the display device 20 does not respond to the infrared wakeup instruction. It should be understood that S309 may be performed before S303, or S308 may be performed after S303 and before S305.

By using the foregoing solution, the handheld device can automatically switch the source port of the display device, and display the to-be-displayed content of the handheld device on the screen of the display device. This provides convenience for the user and greatly shortens a duration for displaying the to-be-displayed content of the handheld device on the screen of the display device, and also avoids a trouble of which the user cannot find a remote controller everywhere.

FIG. 6 is a simplified functional block diagram of an apparatus 800. A USB interface of the apparatus 800 is connected to a port 1233 of a display device 20 by using an adapter cable 105. The apparatus 800 has an infrared remote control application and an infrared emitting apparatus.

The apparatus 800 includes a determining unit 801, a remote control unit 802, and a sending unit 803.

The determining unit 801 is configured to determine whether a preset source port of the display device is the port. Execution of determining whether the preset source port of the display device is the port may be triggered by the following events: after the apparatus 800 starts to be connected to the display device 20 by using the adapter cable 105 for a preset duration, after the apparatus 800 detects a preset condition (for a specific preset condition, refer to the foregoing description), after the apparatus 800 detects one or more operations performed by the user on a handheld device 10, failure or error information is received, or an input, interrupt, or the like is received.

The remote control unit 802 is configured to automatically switch the source port to the port 1233 by using the infrared remote control application when the determining unit 801 determines that the source port is not the port 1233.

The sending unit 803 is configured to send to-be-displayed content of the apparatus 800 to the display device 20 by using the USB interface 104, the adapter cable 105, and the port 1233, so that the display device 20 displays the to-be-displayed content, where the to-be-displayed content includes content displayed by a display of the apparatus 800, or a preset user interface of the apparatus 800.

In some embodiments, that the determining unit 801 is configured to determine whether a source port of display content of the display device 20 is the port 1233 includes:

the determining unit 801, configured to determine, based on a parameter value obtained by using the USB interface 104, whether the source port is the port 1233.

In some embodiments, that the remote control unit 802 is configured to automatically switch the source port to the port 1233 by using the infrared remote control application when the determining unit 801 determines that the source port is not the port 1233 includes:

the remote control unit 802, configured to: automatically start the infrared remote control application when the determining unit 801 determines that the source port is not the port 1233, and trigger, by using the infrared remote control application, the handheld device to send an infrared instruction to the display device 20. The infrared instruction is used to instruct the display device 20 to switch the source port to the port 1233, and an identifier of the port 1233 is obtained by the apparatus 800 from the display device 20 by using the USB interface 104.

In some embodiments, remote control code of the infrared remote control application is automatically set by the apparatus 800 based on at least one of a brand parameter or a model parameter of the display device 20. The brand parameter or the model parameter of the display device is obtained by the apparatus 800 from the display device 20 by using the USB interface 104.

In some embodiments, a type of the USB interface 104 includes one of a USB Type-A interface, a USB Type-B interface, a USB Mini-A interface, a USB Mini-B interface, a USB Micro-A interface, a USB Micro-B interface, or a USB Type-C interface, and a type of the port includes one of an HDMI port, a DP port, a MINI DP port, a USB port, a VGA port, or a DVI port. It should be understood that, when the type of the port is a USB port, the USB port specifically includes one of a USB Type-A port, a USB Type-B port, a USB Mini-A port, a USB Mini-B port, and a USB Micro-A port, a USB Micro-B port, or a USB Type-C port. For example, if the type of the USB interface is the USB Type-C interface, the type of the port is the USB Type-A port.

In some embodiments, before the apparatus 800 determines that the preset source port of the display device 20 is not the port, and the apparatus 800 detects that the display device is in a standby state, the apparatus 800 automatically starts the infrared remote control application. The sending unit 803 is further configured to send an infrared wakeup instruction.

In some embodiments, before the apparatus 800 determines that the preset source port of the display device 20 is not the port, the apparatus 800 automatically starts the infrared remote control application. The sending unit 803 is further configured to send at least one infrared wakeup instruction.

It should be noted that the apparatus 800 may be presented in a form of a functional unit. Without limitation, the term "unit" used in this specification may be an application-specific integrated circuit (ASIC), an electronic circuit, a (shared, dedicated, or group) processor and a memory, or a combinatorial logic circuit for executing one or more software or firmware programs, and/or another appropriate component that provides the function. In a very particular example, persons skilled in the art may learn that the apparatus 800 may use a form of the handheld device 10 in FIG. 1. The determining unit 801 may be implemented by using a processor 102 and/or a processor 107 and a memory 103. Specifically, the processor 102 and/or the processor 107 execute a first instruction in a program in the memory 103, to determine whether the source port of the display content of the display device 20 is the port 1233. The remote control unit 802 may be implemented by using the processor 102 and/or 107, the memory unit 103, and an infrared emitting apparatus 101. Specifically, the processor 102 and/or the processor 107 execute a second instruction of the program in the memory 103, so that when the determining unit 801 determines that the source port is not the port, the infrared emitting apparatus 101 sends an infrared instruction, and switches the source port of the display device 20 to the port. The sending unit 803 may be implemented by using the processor 102 and/or the processor 107, the memory unit 103, and the USB interface 104. Specifically, the processor 102 and/or the processor 107 execute a third instruction of the program in the memory unit 104, and send to-be-displayed content of the apparatus 800 to the display device 20 by using the USB interface 104, the adapter cable 105, and the port 1233, so that the display device 20 displays the to-be-displayed content, where the to-be-displayed content includes content displayed by a display of the apparatus 800, or a preset user interface of the apparatus 800.

Various embodiments provide a handheld device, where a USB interface of the handheld device is connected to a port of a display device by using an adapter cable, and the handheld device includes: an infrared emitting apparatus, one or more processors, a memory, an infrared remote control application, and one or more programs, where the one or more programs are stored in the memory and are configured to be executed by the one or more processors, and the one or more programs include an instruction used to perform the method in FIG. 2 or FIG. 3.

Various embodiments provide a handheld device, where a USB interface of the handheld device is connected to a port of a display device by using an adapter cable, and the handheld device includes: an infrared emitting apparatus, one or more processors, a memory, an infrared remote control application, and one or more programs, where the one or more programs are stored in the memory, the one or more programs include an instruction, and when the instruction is executed by the handheld device, the handheld device is enabled to perform the method shown in FIG. 2 or FIG. 3.

Figure 4:
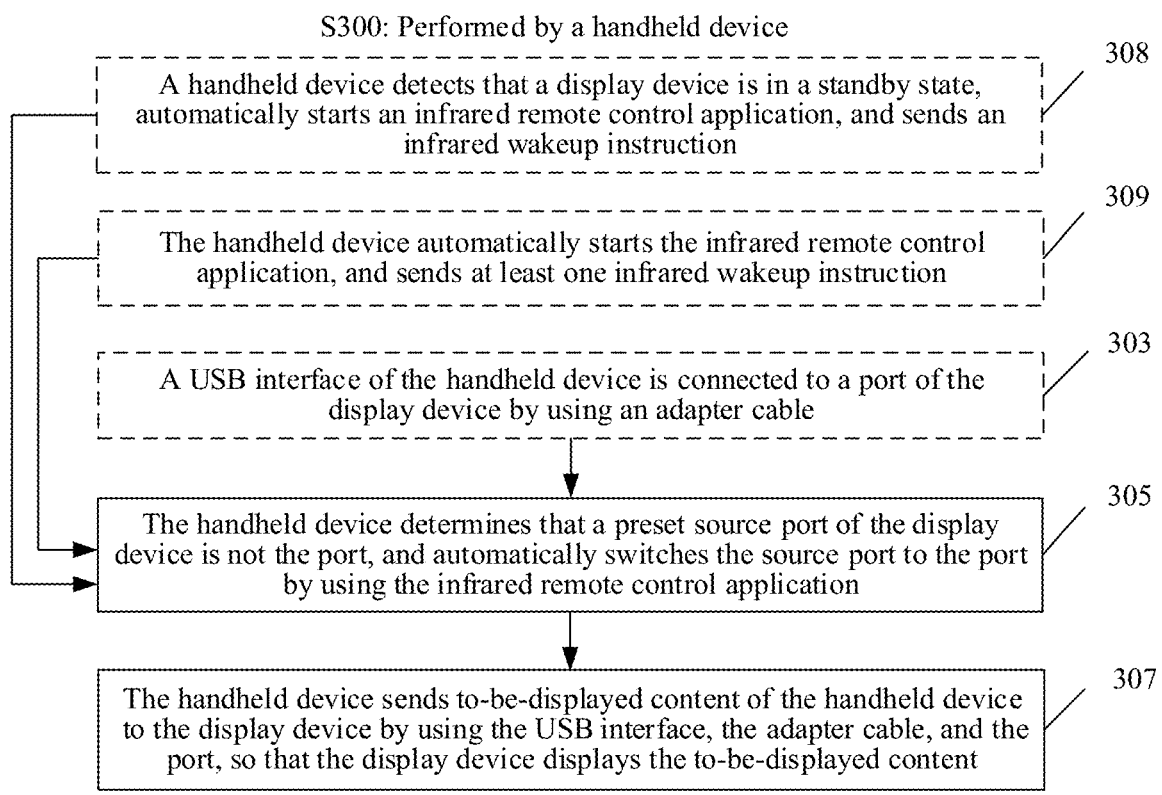
FIG. 4 is a schematic flowchart of another processing method according to an embodiment of the present invention.

Various embodiments provide a device. The device exists in a product form of a chip, a structure of the device includes a processor and a memory, the memory is configured to be coupled to the processor, and configured to store a program instruction and data that are of the device. The processor is configured to execute the program instruction stored in the memory, so that the device performs a data processing function in the prompt method shown in FIG. 3 or FIG. 4.

One embodiment provides a computer-readable storage medium. The storage medium includes an instruction. When the instruction is run on a portable device, the portable device is enabled to perform the prompt method shown in FIG. 2 or FIG. 3.

One embodiment provides a computer program product including an instruction. When the computer program product is run on a portable device, the portable device is enabled to perform the prompt method shown in FIG. 2 or FIG. 3.

One embodiment provides a graphical user interface on a portable device. The portable device includes a display, a memory, a plurality of application programs, and one or more processors configured to execute one or more programs stored in the memory. The graphical user interface includes the user interface displayed in the method shown in FIG. 2 or FIG. 3 or user interfaces shown in FIG. 7a to FIG. 7c.

Figure 7A:
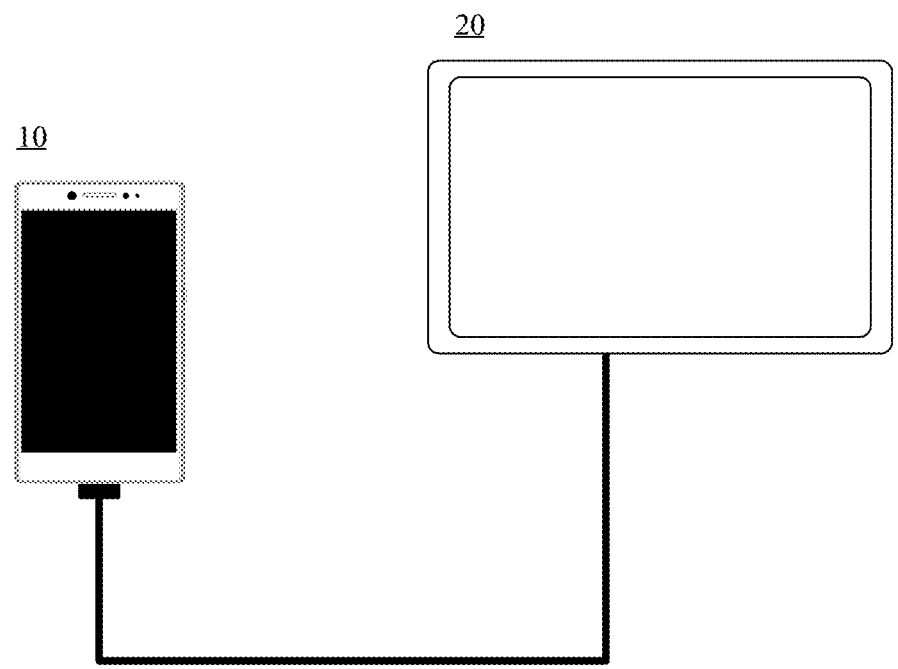
FIG. 7a to FIG. 7c are a schematic diagram of a graphical user interface that may appear on a handheld device according to an embodiment of the present invention.
Figure 7B:
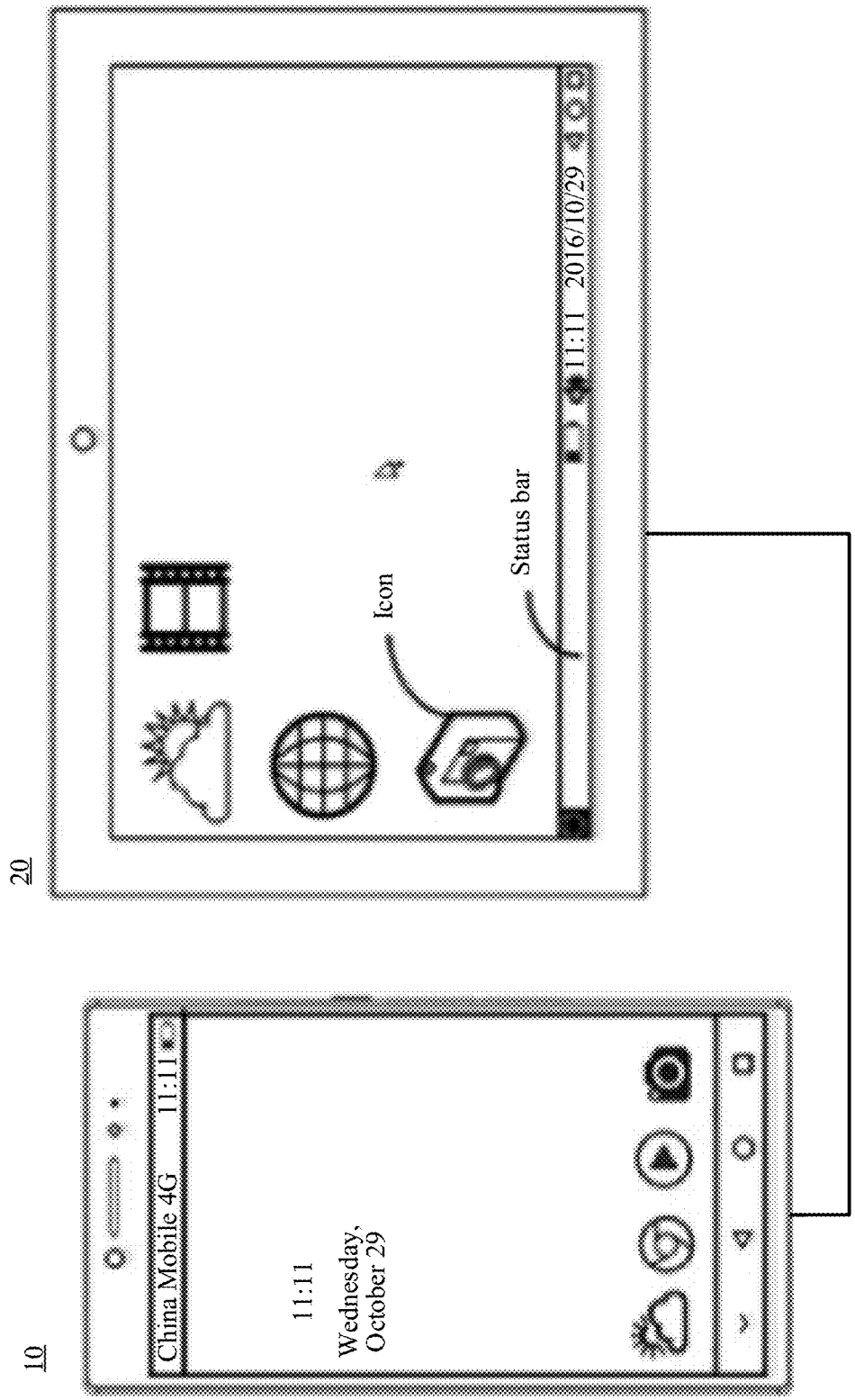
Figure 7C:
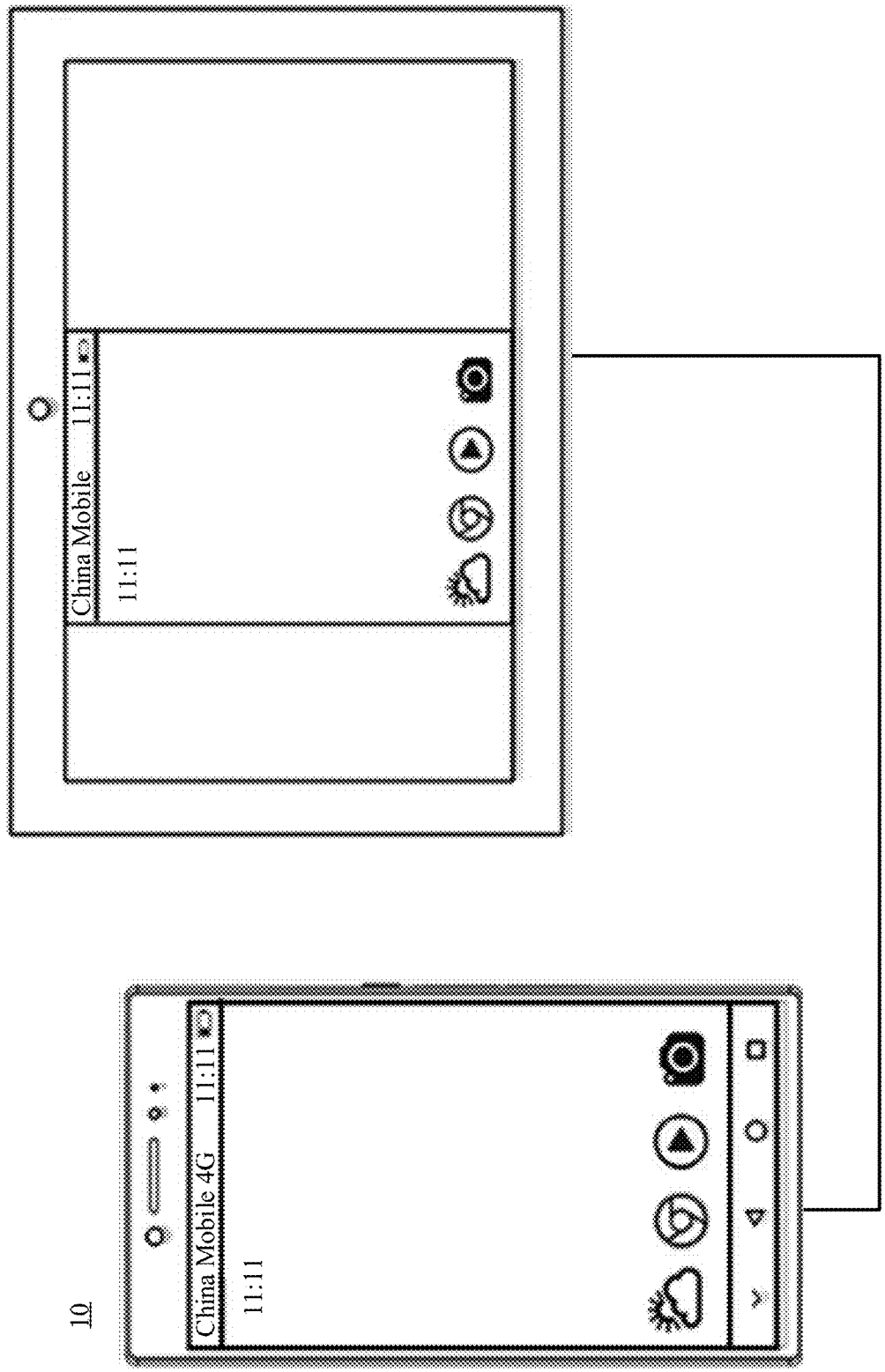

It should be understood that FIG. 7a shows that a USB interface of a handheld device 10 is connected to a port of a display device 20 by using an adapter cable. It is assumed that a type of the USB interface of the handheld device 10 is USB Type-C, the adapter cable is USB Type-C to HDMI, a port that is of the display device 20 and to which the adapter cable is connected is an HDMI 3, and a preset source port of the display device 20 is a VGA. After the handheld device 10 performs the method in FIG. 2 or FIG. 3, if to-be-displayed content is a preset user interface of the handheld device 10, a graphical user interface of the handheld device 10 and a graphical user interface of the display device 20 are shown in FIG. 7b; and if the to-be-displayed content is content displayed by a display of the handheld device 10, the graphical user interface of the handheld device 10 and the graphical user interface of the display device 20 are shown in FIG. 7c.

Steps of methods or algorithms described in the embodiments herein may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

Persons skilled in the art understand that the prior art has progressed to the following degree: difference between hardware and software implementations of various aspects of a system is extremely small, and usage of hardware or software is usually (but not always, because selecting hardware or software in some environments becomes extremely important) a design selection to balance costs and efficiency. Persons skilled in the art understand that there are tools (such as hardware, software, and/or firmware) capable of implementing the processes and/or systems and/or other technologies in this specification, and that preferred tools change according to environments of deployment processes and/or systems and/or other technologies.

Persons of ordinary skill in the art are supposed to understand that all or some of subject matters in this application may be implemented in software with reference to hardware and/or firmware. For example, the subject matters described in this specification may be implemented in software that is performed by one or more processors. In an example of an implementation, the subject matters described in this specification may be implemented by using a non-transitory computer readable medium that stores a computer executable instruction. When a computer processor executes the computer executable instruction, the instruction controls the computer to perform steps. An example of a computer-readable medium applicable to implementation of the subject matters described in this specification includes the non-transitory computer readable medium, such as a magnetic disk storage device, a chip storage device, a programmable logical device, or an application-specific integrated circuit. In addition, the computer-readable medium that implements the subject matters described in this specification may be located on a single device or computing platform, or may be distributed on a plurality of devices or computing platforms.

Finally, it should be understood that the foregoing embodiments are merely used for explanation, but not limited to the technical solutions in this application. Although this application is described in detail with reference to the foregoing preferred embodiment, it should be understood that persons skilled in the art may make various modifications, changes, or equivalent replacements without departing from the scope of this application and the appended claims.

What is claimed is:

1. A method, applied to a handheld device with an infrared remote control application, wherein a USB interface of the handheld device is connected to a port of a display device by using an adapter cable, and the method comprises:
   determining, by the handheld device, that a preset source port of the display device is not the port of the display device, and automatically switching the preset source port to the port of the display device by using the infrared remote control application; and
   sending, by the handheld device, to-be-displayed content of the handheld device to the display device by using the USB interface, the adapter cable, and the port of the display device, to enable the display device to display the to-be-displayed content, wherein the to-be-displayed content comprises content displayed by a display of the handheld device, or a preset user interface of the handheld device.

2. The method according to claim 1, wherein determining, by the handheld device, that the source port for displaying content of the display device is not the port of the display device comprises:
   determining, by the handheld device based on a parameter value obtained by using the USB interface, that the source port is not the port of the display device.

3. The method according to claim 2, wherein automatically switching the source port to the port of the display device by using the infrared remote control application comprises:
   automatically starting the infrared remote control application, and triggering, by using the infrared remote control application, the handheld device to send an infrared instruction to the display device, wherein the infrared instruction is configured to instruct the display device to switch the source port to the port of the display device, and an identifier of the port is obtained by the handheld device from the display device by using the USB interface.

4. The method according to claim 2, wherein a remote control code of the infrared remote control application is automatically set by the handheld device based on at least one of a brand parameter or a model parameter of the display device, and the brand parameter or the model parameter of the display device is obtained by the handheld device from the display device by using the USB interface.

5. The method according to claim 1, wherein automatically switching the source port to the port of the display device by using the infrared remote control application comprises:
automatically starting the infrared remote control application, and triggering, by using the infrared remote control application, the handheld device to send an infrared instruction to the display device, wherein the infrared instruction is configured to instruct the display device to switch the source port to the port of the display device, and an identifier of the port of the display device is obtained by the handheld device from the display device by using the USB interface.

6. The method according to claim 1, wherein a remote control code of the infrared remote control application is automatically set by the handheld device based on at least one of a brand parameter or a model parameter of the display device, and the brand parameter or the model parameter of the display device is obtained by the handheld device from the display device by using the USB interface.

7. The method according to claim 1, wherein a type of the USB interface comprises one of a USB Type-A interface, a USB Type-B interface, a USB Mini-A interface, a USB Mini-B interface, a USB Micro-A interface, a USB Micro-B interface, or a USB Type-C interface, and a type of the port of the display device comprises one of an HDMI port, a DP port, a MINI DP port, a USB port, a VGA port, or a DVI port.

8. A handheld device, wherein a USB interface of the handheld device is connected to a port of a display device by an adapter cable, and
the handheld device comprises:
an infrared emitting apparatus;
one or more processors;
a memory; and
an infrared remote control application;
wherein the memory is configured to store one or more programs configured to be executed by the one or more processors such that when the one or more programs are executed by the one or more processors, the one or more processors are caused to:
determine that a preset source port of the display device is not the port of the display device, and automatically switch the source port to the port of the display device by using the infrared remote control application; and
send to-be-displayed content of the handheld device to the display device by using the USB interface, the adapter cable, and the port of the display device to enable the display device to display the to-be-displayed content, wherein the to-be-displayed content comprises content displayed by a display of the handheld device, or a preset user interface of the handheld device.

9. The handheld device according to claim 8, wherein the one or more processors are further caused to determine, based on a parameter value obtained by using the USB interface, that the source port is not the port of the display device.

10. The handheld device according to claim 9, wherein the one or more processors are further caused to: automatically start the infrared remote control application, and trigger, by using the infrared remote control application, the handheld device to send an infrared instruction to the display device, wherein the infrared instruction is configured to instruct the display device to switch the source port to the port of the display device, and an identifier of the port of the display device is obtained by the handheld device from the display device by using the USB interface.

11. The handheld device according to claim 9, wherein a remote control code of the infrared remote control application is automatically set by the handheld device based on at least one of a brand parameter or a model parameter of the display device, and the brand parameter or the model parameter of the display device is obtained by the handheld device from the display device by using the USB interface.

12. The handheld device according to claim 8, wherein the one or more processors are further caused to: automatically start the infrared remote control application, and trigger, by using the infrared remote control application, the handheld device to send an infrared instruction to the display device, wherein the infrared instruction is configured to instruct the display device to switch the source port to the port of the display device, and an identifier of the port of the display device is obtained by the handheld device from the display device by using the USB interface.

13. The handheld device according to claim 8, wherein a remote control code of the infrared remote control application is automatically set by the handheld device based on at least one of a brand parameter or a model parameter of the display device, and the brand parameter or the model parameter of the display device is obtained by the handheld device from the display device by using the USB interface.

14. The handheld device according to claim 8, wherein a type of the USB interface comprises one of a USB Type-A interface, a USB Type-B interface, a USB Mini-A interface, a USB Mini-B interface, a USB Micro-A interface, a USB Micro-B interface, or a USB Type-C interface, and a type of the port of the display device comprises one of an HDMI port, a DP port, a MINI DP port, a USB port, a VGA port, or a DVI port.

15. A non-transitory computer-readable storage medium for storing one or more programs, wherein the one or more programs comprise an instruction, and when the instruction is executed by a handheld device, wherein a USB interface of the handheld device with an infrared remote control application is connected to a port of a display device by using an adapter cable, the handheld device performs the following operations:
determining, by the handheld device, that a preset source port of the display device is not the port of the display device, and automatically switching the source port to the port of the display device by using the infrared remote control application; and
sending, by the handheld device, to-be-displayed content of the handheld device to the display device by using the USB interface, the adapter cable, and the port of the display device to enable the display device to display the to-be-displayed content, wherein the to-be-displayed content comprises content displayed by a display of the handheld device, or a preset user interface of the handheld device.

16. The non-transitory computer-readable storage medium according to claim 15, wherein that the handheld device determines that the source port for displaying content of the display device is not the port of the display device comprises:

determining, by the handheld device based on a parameter value obtained by using the USB interface, that the source port is not the port of the display device.

17. The non-transitory computer-readable storage medium according to claim 16, wherein automatically switching the source port to the port of the display device by using the infrared remote control application comprises:

automatically starting the infrared remote control application, and triggering, by using the infrared remote control application, the handheld device to send an infrared instruction to the display device, wherein the infrared instruction is configured to instruct the display device to switch the source port to the port of the display device, and an identifier of the port of the display device is obtained by the handheld device from the display device by using the USB interface.

18. The non-transitory computer-readable storage medium according to claim 15, wherein automatically switching the source port to the port of the display device by using the infrared remote control application comprises:

automatically starting the infrared remote control application, and triggering, by using the infrared remote control application, the handheld device to send an infrared instruction to the display device, wherein the infrared instruction is configured to instruct the display device to switch the source port to the port of the display device, and an identifier of the port of the display device is obtained by the handheld device from the display device by using the USB interface.

19. The non-transitory computer-readable storage medium according to claim 15, wherein a remote control code of the infrared remote control application is automatically set by the handheld device based on at least one of a brand parameter or a model parameter of the display device, and the brand parameter or the model parameter of the display device is obtained by the handheld device from the display device by using the USB interface.

20. The non-transitory computer-readable storage medium according to claim 15, wherein a type of the USB interface comprises one of a USB Type-A interface, a USB Type-B interface, a USB Mini-A interface, a USB Mini-B interface, a USB Micro-A interface, a USB Micro-B interface, or a USB Type-C interface, and a type of the port of the display device comprises one of an HDMI port, a DP port, a MINI DP port, a USB port, a VGA port, or a DVI port.

* * * * *